Patented Apr. 14, 1942

2,279,721

UNITED STATES PATENT OFFICE 2,279,721

PROCESS OF PREPARING CYCLOALKANES

Walter Schmidt, Frankfort-on-the-Main-Hochst, Franz Josef Pohl, Hofheim in Taunus, and Otto Nicodemus, Frankfort - on - the - Main - Hochst, Germany, assignors, by mesne assignments, to Winthrop Chemical Company, Inc., New York, N. Y., a corporation of New York No Drawing. Application March 11, 1939, Serial No. 261,374. In Germany March 12, 1938

5 Claims. (Cl. 260—666)

The present invention relates to a process of preparing cycloalkanes.

It is known that dibromalkanes such as 1:3-dibromopropane yield cyclopropane in the presence of zinc and aqueous alcohol. In industry this process has many drawbacks. On the one hand the separation of the two bromine atoms is not uniform, as besides the ring closure there may be observed the formation of considerable quantities of hydrogen and, in consequence thereof, of propane. On the other hand a large excess of zinc is necessary especially when the zinc halide formed has the opportunity of encrusting the surface of the metal.

A modification of this method which consists in gradually adding the dibromopropane to the reaction mixture instead of mixing the zinc dust, the solvent and the dibromopropane as usual and causing them to react simultaneously, also involves no essential advantage.

If it be attempted to use dichloroalkanes instead of dibromalkanes the reaction with the zinc occurs much more slowly. It has, therefore, been proposed to use as solvents ethers and hydrocarbons having a higher boiling point than dichloropropane in order to permit use of a higher reaction temperature and to accelerate and improve the reaction. In this case, however, the drawbacks described above are especially observed as the metal surface is then particularly strongly encrusted by the zinc chloride formed.

In order to avoid these drawbacks and to make it possible to operate at a low temperature it has been proposed to introduce alkali iodide into the reaction. By the presence of iodine ions which cause an intermediate formation of iodoalkanes it was hoped to facilitate the reaction with the zinc.

Now we have found that dibromalkanes and dichloralkanes may especially readily be transformed into the corresponding cyclic compounds by causing zinc to act upon a compound of the general formula

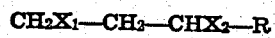

wherein $X_1$ and $X_2$ stand for chlorine or bromine and R stands for hydrogen or methyl, in the presence of an organic compound capable of forming soluble complex compounds with the zinc halide formed.

As compounds capable of forming soluble complex compounds with the zinc chloride or zinc bromide formed there may be used amides of carboxylic acids and sulfonic acids, esters of organic carboxylic acids and nitriles thereof; for instance formamide, methylacetamide, lauric acid-amide, benzenesulfonamide, para - toluenesulfonamide, isohexylic acid-nitrile, butyl butyrate, oxalic acid-diethyl ester, ethyl-urethane or the like.

The expression soluble complex compound means that the complex compound is to be soluble in the excess of the organic complex-forming compound used. The latter, therefore, must be used in such a quantity that the zinc halide formed is dissolved during the reaction. Generally at least about 3 to 5 mols of the complex-forming compound should be used for 1 mol of the dihalogenalkane. Depending on the parent material used the temperature necessary for the reaction may vary between room temperature and about 150° C. It may be suitable to start the reaction at raised temperature and to complete it at room temperature. The reaction is finished when gas no longer escapes from the mixture. Depending upon the parent material used it is possible to choose from the great number of substances which can be used the complex-forming compound which affords the best working conditions for the desired reaction.

Formamide has proved to be especially useful in many reactions; it is, as stated above, used in such an excess that the zinc complex compound remains dissolved during the reaction. The most suitable ratio is about 5 to about 10 mols of formamide to 1 mol of dihalogenalkane. The reaction of dibromopropane with zinc to form cyclopropane may, for instance, be carried out with the best yield in the presence of formamide even at room temperature—about 15° C. to about 20° C., the final product being practically pure so that further complicated and expensive purification processes are unnecessary. In contrast with the known processes in which a considerable excess of zinc—up to 400 per cent—is used the present process requires only about that quantity which is calculated for the reaction. Similar industrial progress follows the use of other compounds mentioned above.

For the reaction there may be used 1:3-dichloropropane; 1:3-dibromopropane; 1-chloro-3-bromopropane; 1:3-dichloro-n-butane; 1:3-dibromo-n-butane. When 1:3-dihalogen-n-butanes are used methyl cyclopropane is formed.

The following examples serve to illustrate the invention, but they are not intended to limit it thereto; the parts are by weight, parts by volume having the same ratio to parts by weight that the liter has to the kilo.

(1) 2020 parts of pure 1:3-dibromopropane free from 1:2-dibromopropane are introduced drop by drop, while stirring, into a suspension heated to 40° C. of 722 parts of zinc dust containing 90 per cent of active zinc in 2250 parts of formamide. After the reaction has set in the temperature is reduced to about 14° C. to about 15° C. where it is kept by cooling with water. The evolution of gas proceeds very quickly; the gas contains about 99.8 per cent of cyclopropane and is liquefied by cooling. After all the dibromopropane has been dropped in the whole is heated for a short time to 40° C. until the reaction is finished. The yield amounts to above 90 per cent of the theory.

(2) As described in Example 1, a mixture of 1188 parts of 1:3-dibromo-n-butane and 397 parts of zinc dust containing 90 per cent of active zinc is caused to react in 1238 parts of formamide, but after the reaction has set in the temperature is kept at about 20° C. The gas produced contains 99.6 to 99.7 per cent of methylcyclopropane; the yield amounts to above 90 per cent of the theory.

(3) A mixture of 5 parts of 1:3-dichloro-n-butane, 30 parts of zinc dust containing 90 per cent of active zinc and 150 parts by volume of N-methylacetamide is cautiously heated, while stirring, until the evolution of gas sets in; further 45 parts of 1:3-dichloro-n-butane are then introduced drop by drop in such a manner that the temperature remains nearly constant. The liquefied product contains 98.2 per cent of methylcyclopropane.

(4) 68 parts of 1:3-dibromopropane are caused to react, as described in Example 3, with a mixture of 50 parts of zinc dust containing 90 per cent of active zinc in 150 parts by volume of butyl butyrate. The reaction product contains 99.3 per cent of cyclopropane. The yield amounts to 93 per cent of the theory.

(5) In a manner analogous to that described in Example 3, 68 parts of 1:3-dibromopropane are caused to react with a mixture of 50 parts of zinc dust containing 90 per cent of active zinc in 150 parts by volume of pyridine. A product is obtained in a good yield containing 99 per cent of cyclopropane.

(6) In a manner analogous to that described in Example 3 a mixture of 72 parts of 1:3-dibromo-n-butane in 150 parts by volume of isohexylic acid-nitrile is heated with 50 parts of zinc dust containing 90 per cent of active zinc. The product contains 99.2 per cent of methylcyclopropane. The yield amounts to 92 per cent of the theory.

(7) 788 parts of pure 1-chloro-3-bromopropane are caused to react, as described in Example 1, with a mixture of 361 parts of zinc dust containing 90 per cent of active zinc in 1125 parts of formamide. The reaction product contains 99.6 per cent of cyclopropane. The yield amounts to about 96 per cent of the theory.

We claim:

1. In the process of preparing cyclopropane the step which comprises causing a mixture consisting of zinc dust and 1:3-dibromopropane to react in the presence of about 5 mols of formamide calculated upon 1 mol of 1:3-dibromopropane.

2. In the process of preparing methylcyclopropane the step which comprises causing a mixture consisting of zinc dust and 1:3-dibromo-n-butane to react in the presence of about 5 mols of formamide calculated upon 1 mol of 1:3-dibromo-n-butane.

3. In the process of preparing cyclopropane the step which comprises causing a mixture consisting of zinc dust and 1-chloro-3-bromopropane to react in the presence of about 5 mols of formamide calculated upon 1 mol of 1-chloro-3-bromopropane.

4. In the process of preparing aliphatic cyclic hydrocarbons containing three cyclic carbon atoms the step which comprises causing a mixture consisting of zinc and of a compound of the general formula $CH_2X_1-CH_2-CHX_2-R$ wherein $X_1$ and $X_2$ stand for a halogen selected from the group consisting of chlorine and bromine, and R stands for a substituent selected from the group consisting of hydrogen and methyl, to react in the presence of formamide.

5. In the process of preparing aliphatic cyclic hydrocarbons containing three cyclic carbon atoms the step which comprises causing a mixture consisting of zinc and of a compound of the general formula $CH_2X_1-CH_2-CHX_2-R$ wherein $X_1$ and $X_2$ stand for a halogen selected from the group consisting of chlorine and bromine, and R stands for a substituent selected from the group consisting of hydrogen and methyl, to react in the presence of such an amount of formamide as is capable of dissolving the complex formamide-zinc halide compound formed.

WALTER SCHMIDT.
FRANZ JOSEF POHL.
OTTO NICODEMUS.